United States Patent [19]

Yusawa et al.

[11] Patent Number: 4,983,742

[45] Date of Patent: Jan. 8, 1991

[54] FIRE-RETARDANT 1-BUTENE RESIN COMPOSITION

[75] Inventors: Motoyasu Yusawa, Iwakuni; Chikara Igarashi, Ohtake, both of Japan

[73] Assignee: Mitsui Petrochemical Industries, Ltd., Tokyo, Japan

[21] Appl. No.: 946,165

[22] Filed: Dec. 23, 1986

Related U.S. Application Data

[63] Continuation of Ser. No. 704,039, Feb. 21, 1985, abandoned, which is a continuation of Ser. No. 610,861, May 16, 1984, abandoned.

[30] Foreign Application Priority Data

May 17, 1983 [JP] Japan .................................. 58-84951

[51] Int. Cl.$^5$ ................................................ C08K 3/10
[52] U.S. Cl. .................................... 524/436; 524/437; 524/504
[58] Field of Search ...................... 524/436, 437, 504; 525/63, 69, 78

[56] References Cited

U.S. PATENT DOCUMENTS 3,886,227  5/1975  Van Brederode et al. ........... 525/80

Primary Examiner—Kriellion Morgan
Attorney, Agent, or Firm—Sherman and Shalloway

[57] ABSTRACT

A fire-retardant 1-butene resin composition composed of (A) 100 parts by weight of a 1-butene polymer or copolymer containing 0 to 20 mole % of an olefin with 2 to 20 carbon atoms other than 1-butene as a comonomer, (B) 110 to 1,000 parts by weight of an inorganic hydroxide selected from the group consisting of magnesium hydroxide and aluminum hydroxide, and (C) 10 to 150 parts by weight of a graft-modified olefin resin resulting from grafting of an unsaturated carboxylic acid or its functional derivative to a polymer or a copolymer of an olefin having 3 to 8 carbon atoms or a copolymer of said olefin with up to 30 mole % of ethylene.

16 Claims, No Drawings

FIRE-RETARDANT 1-BUTENE RESIN COMPOSITION

This application is a continuation of application Ser. No. 704,039, now abandoned, filed Feb. 21, 1985, which is a continuation-in-part of application Ser. No. 610,861, filed May 16, 1984, now abandoned.

This invention relates to a fire-retardant 1-butene resin composition having excellent improved properties and comprising an inorganic hydroxide such as magnesium hydroxide as a fire retardant. The composition overcomes troubles, such as a deterioration in mechanical properties and moldability, which are due to the incorporation of the fire retardant, and has excellent fire retardancy and improved mechanical properties and moldability. Moreover, the composition of this invention can advantageously overcome the 1-butene resin's inherent disadvantage that the speed of its crystal transition to a stable crystalline state is low.

More specifically, this invention relates to a fire-retardant 1-butene resin composition composed of (A) 100 parts by weight of a 1-butene polymer or copolymer containing 0 to 20 mole% of an olefin with 2 to 20 carbon atoms other than 1-butene as a comonomer, (B) 110 to 1,000 parts by weight of an inorganic hydroxide selected from the group consisting of magnesium hydroxide and aluminum hydroxide, and (C) 10 to 150 parts by weight of a graft-modified olefin resin resulting from grafting of an unsaturated carboxylic acid or its functional derivative to a polymer or a copolymer of an olefin having 3 to 8 carbon atoms or a copolymer of said olefin with up to 30 mole% of ethylene.

Crystalline 1-butene resins have excellent creep characteristics, strength against deformation, and heat resistance, and by taking advantage of these properties, research and development work has been undertaken on their utilization in melt-shaped articles and other applications. As with the other olefin resins, 1-butene resins have the defect of readily burning.

Attempts have been made to impart fire retardancy to the 1-butene resins by incorporating fire retardants, but have not proved to be entirely successful. Or when such fire retardants are added in amounts which serve for fire-retarding purposes, there is a substantial deleterious effect on the desirable properties of the 1-butene resins.

For example, Japanese Patent Publication No. 5254/1973 (corresponding to British Patent No. 1,280,248) discloses that an olefin resin is rendered fire-retardant by incorporating antimony oxide, ammonium fluoroborate and a halogen-containing compound such as tris(2,3-dibromopropyl)phosphate and chlorinated paraffin. The resin composition provided by this patent document exhibit improved fire retardancy. But when it burns, the amount of smoke is large and toxic gases are generated.

The use of an inorganic hydroxide fire retardant such as magnesium hydroxide free from such a trouble is also known. For example, Japanese Patent Publication No. 10890/1982 proposed a magnesium hydroxide powder having a bulk density of 0.35 to 0.70 g/cc, a specific surface area of 10 to 30 m$^2$/g and a ratio of the thickness of crystallites in a direction perpendicular to the (110) plane to that in the (001) plane in its crystal lattice of from 1.7 to 2.7 as a filler useful for rendering plastics fire-retardant. This patent document states that the magnesium hydroxide powder is used preferably after it is surface-treated with a higher fatty acid or its salt, or a silane coupling agent, and it is possible to provide plastics having fire retardancy and good mechanical properties and moldability.

This patent document states that the plastics include rubbers and thermosetting plastics, but thermoplastic resins are particularly suitable, and it exemplifies polybutene along with many other resins. But it does not give any actual example of incorporating such a fire retardant in polybutene. Naturally, therefore, this patent document fails to suggest or disclose the overcoming of the 1-butene resin's inherent disadvantage that the speed of its crystal transition to a stable crystalline state is low.

As will be experimentally shown in Comparative Examples given hereinbelow, when the magnesium hydroxide fire retardant is incorporated in the 1-butene resin in an amount capable of rendering it fire-retardant, the mechanical properties of the resin are not entirely satisfactory. Moreover, the crystal transition speed of the 1-butene resin remains low.

It is known that when solidified from its molten state, the 1-butene resin initially assumes a pseudostable II type (tetragonal system transformation), and then slowly passes into a stable I type (hexagonal system transformation) over several days. In the state of the II type, a shaped article of the 1-butene resin is soft. If, therefore, the shaped article undergoes deformation by handling, storage, transportation, or otherwise while it is of the II type and is transformed in this state to the I type, the deformation remains in the article to make it commercially valueless. Accordingly, the handling of the shaped article before complete transition to the I type is troublesome, and much expertise and labor are being used in trying to prevent the remaining of such undesirable deformation.

The present inventors have made extensive investigations in order to develop a fire-retardant 1-butene resin composition having excellent fire retardancy and improved mechanical properties and moldability while solving the aforesaid technical problem inherent to the 1-butene resin. These investigations have led to the discovery that a 1-butene resin composition composed of (A) the 1-butene polymer or copolymer, (B) the inorganic hydroxide and (C) the graft-modified olefin resin, which may further contain additives, is a new type of fire-retardant 1-butene resin composition which has excellent fire retardancy, improved mechanical properties and moldability and an increased crystal transition speed without such troubles as a deterioration in mechanical properties and moldability which are ascribable to the incorporation of the fire retardant (B) selected from magnesium hydroxide and aluminum hydroxide.

It is an object of this invention therefore to provide a new type of fire-retardant 1-butene resin composition having improved properties.

The above and other objects and advantages of this invention will become more apparent from the following description.

The 1-butene resin (A) utilized in this invention is a 1-butene polymer or copolymer containing 0 to 20 mole% of an olefin with 2 to 20 carbon atoms other than 1-butene as a comonomer. Examples of the olefin having 2 to 20 carbon atoms used as a comonomer include ethylene, propylene, 4-methyl-1-pentene, 1-hexene, 1- octene, 1-decene and 1-octadecene. They may be used either singly or in combination.

Preferably, the 1-butene polymer or copolymer (A) has a melt flow rate (MFR), determined by ASTM D 1238N, of from 0.1 to 50 g/10 min., and a degree of crystallinity of 20 to 65%. The degree of crystallinity is determined by the X-ray method. Specifically, the 1-butene polymer or copolymer is melted at 200° C. for 10 minutes, and then pressed by a cold press at 30° C. under a pressure of 50 kg/cm$^2$.G to prepare a 1 mm test specimen. The test specimen is left to stand at room temperature for 10 days. The diffraction pattern of the specimen is then measured by X-rays (Cu-K$_\alpha$) at a diffraction angle $2\theta$ in the range of 3 to 40°. The crystallinity is calculated in accordance with the following equation.

$$\text{Crystallinity} = \frac{\text{Crystal peak area}}{\text{Halo area} + \text{crystal peak area}} \times 100$$

Among the 1-butene polymer or copolymers, a random copolymer of 1-butene is preferred. In particular, copolymers of 1-butene with olefins having 2 to 8 carbon atoms, which have an MFR, determined by ASTM D1238N, of 0.1 to 50 g/10 min. and a degree of crystallinity of from 20 to 55%, are preferred.

The inorganic hydroxide (B) selected from the group consisting of magnesium hydroxide and aluminum hydroxide is preferably in the form of a fine powder having an average particle size of about 50 millimicrons to about 5 microns, more preferably 200 millimicrons to 2 microns. The fine powder of the inorganic hydroxide may be in the shape of a petal, a plate or a needle. If the average particle size is too small below about 50 millimicrons, the particles tend to agglomerate into secondary particles. The agglomerated particles are likely to exist as such in the final resin composition and may adversely affect the mechanical strength of the resin composition. Accordingly, the average particle size should be at least about 50 millimicrons. On the other hand, if the average particle size is too large above about 5 microns, the fire-retarding effect and mechanical properties of the final resin composition are deteriorated, and its moldability is also adversely affected. Moreover, there is a deleterious effect on the surface luster and smoothness of a molded article produced from the resulting composition. Hence, the inorganic hydroxide used in this invention preferably has an average particle size within the above-specified range.

The amount of the inorganic hydroxide (B) in the composition of this invention is 110 to 1,000 parts by weight per 100 parts by weight of the 1-butene polymer or copolymer (A). If it is too small below 110 parts by weight, it is difficult to impart a satisfactory fire-retarding effect. If it is too large beyond 1,000 parts by weight, there is a reduction in mechanical strengths such as tensile strength and impact strength, and adverse effects are exerted also on the moldability of the resulting composition and the appearance of molded articles therefrom. Accordingly, the amount of the component (B) is properly selected within the above-specified range The graft-modified olefin resin used in this invention is an essential component in combination with the component (A) and the component (B) described above. The combination of these three components in the amounts specified contributes to the imparting of excellent fire retardancy, mechanical properties and moldability to the resin composition of this invention and to the increasing of the crystal transition speed of the 1-butene polymer or copolymer.

The graft-modified olefin resin (C) results from grafting of an unsaturated carboxylic acid or its functional derivative to a polymer or a copolymer of an olefin with 3 to 8 carbon atoms or a copolymer of said olefin with up to 30 mole% of ethylene. The graft-modified olefin resin can be produced by methods known per se, or is commercially available. For example, it can be produced by grafting an unsaturated carboxylic acid or its functional derivative as a grafting monomer to a polymer or a copolymer of an olefin with 3 to 8 carbon atoms or a copolymer of said olefin with up to 30 mole% of ethylene as a trunk polymer in the presence or absence of a solvent and in the presence or absence of a radical initiator. Another copolymerizable monomer such as styrene may be present in the reaction system. The grafting reaction can be carried out at a temperature of, for example, about 100 to about 200° C. Examples of the solvent that can be used in this reaction are hexane, heptane, octane, decalin, benzene, toluene and xylene.

Examples of the radical initiators that can be used include organic peroxides and peresters such as benzoyl peroxide, dichlorobenzoyl peroxide, dicumyl per oxide, di-tert-butyl peroxide, 2,5-dimethyl-2,5-di-(peroxybenzoate)hexyne-3, 1,4-bis(tert-butylperoxyisopropyl)benzene, lauroyl peroxide, tert-butyl peracetate, 2,5-dimethyl-2,5-di(tert-butylperoxy)hexyne-3, 2,5-di(tert-butylperoxy)hexane, tert-butyl perbenzoate, tert-butyl perphenylacetate, tert-butyl perisobutyrate, tert-butyl per-sec-octoate, tert-butyl perpivalate, cumyl perpivalate and tert-butyl perdiethylacetate; and azo compounds such as azobisisobutyronitrile and dimethylasodiisobutyrate.

Examples of the polymer or copolymer of an olefin having 3 to 8 carbon atoms or a copolymer of said olefin with up to 30 mole%, preferably up to 20 mole% of ethylene, as trunk polymer, include polypropylene, poly-1-butene, poly-4-methyl-1-pentene, propylene-/ethylene copolymer, 1-butene/ethylene copolymer, propylene/1-butene copolymer, propylene/4-methyl-1-pentene copolymer and mixtures of these. Among them, polypropylene, propylene/ethylene copolymer containing up to 20 mole% of ethylene, propylene/1-butene copolymer containing up to 30 mole% of 1-butene and propylene/4-methyl-1-pentene copolymer containing up to 30 mole% of 4-methyl-1-pentene are preferred because they result in a resin composition having excellent mechanical properties.

The unsaturated carboxylic acid or its functional derivative used as the grafting monomer may preferably be an unsaturated carboxylic acid having 3 to 10 carbon atoms, or its functional derivative such as its anhydride or lower alkyl ester. Specific examples include acrylic acid, methacrylic acid, maleic acid, maleic anhydride, citraconic acid, citraconic anhydride, itaconic acid, itaconic anhydride, 3-cyclohexenecarboxylic acid, 4-cyclohexenedicarboxylic acid, 5-norbornene-2,3-dicarboxylic acid, and lower alkyl esters of these acids. Alpha, beta unsaturated dicarboxylic acids and their functional derivatives, particularly maleic anhydride, are more preferred.

The amount of the grafting monomer grafted to the trunk polymer may be properly selected. Preferably, about 0.01 to about 10 parts by weight of the unsaturated carboxylic acid or is functional derivative is grafted per 100 parts by weight of the polymer or copolymer of an olefin having 3 to 8 carbon atoms or a copolymer of said olefin with up to 30 mole% of ethylene. The intrinsic viscosity (N) of the graft-modified olefin resin (C) is, for example, about 0.1 to about 5 dl/g, preferably about 0.2 to about 3 dl/g, measured at 135° C. in Decalin.

The amount of the graft-modified olefin resin (C) in the composition of this invention is 10 to 150 part by weight per 100 parts by weight of the 1-butene polymer or copolymer (A). If it is too small below 10 parts by weight, it is difficult to impart excellent improved properties to the composition of this invention by the combination of the component (C) with the components (A) and (B). If, on the other hand, the amount is too large beyond 150 parts, the mechanical properties of the composition of the invention are deteriorated. Accordingly, the amount of component (C) is selected within the above-specified range.

The amount of the graft-modified olefin resin (C) can be properly varied depending upon the kind of the trunk polymer and the amount of the grafting monomer grafted. Preferably, it is about 3 to about 35% by weight based on the total weight of the components (A), (B) and (C).

As required, the composition of this invention may further contain additives in addition to the three essential components (A), (B) and (C).

An example of the additives is an olefin resin other than the 1-butene polymer or copolymer (A). For example, it is a polymer or copolymer of an olefin having 2 to 6 carbon atoms such as low density polyethylene, high density polyethylene, polypropylene, poly-4-methyl-1-pentene, ethylene-propylene copolymer and propylene-1-butene copolymer. One or more of these polymers or copolymers may be used. The amount of the additional polymer or copolymer may be any suitable one which does not adversely affect the improved properties of the composition of this invention. For example, it is up to about 200 parts by weight, preferably up to about 150 parts by weight, per 100 parts by weight of the 1-butene polymer or copolymer (A). If the additional resin is used in an excessive amount, the effect of adding the graft-modified olefin resin (C) is reduced.

Other examples of the additives include weather-ability stabilizers, heat stabilizers, slip agents, nucleating agents, coloring agents (pigments, dyes), and lubricants. Specific examples of the other additives include heat-stabilizers of the phenol, sulfur, amine or phosphorus type, such as p-hydroxyanisole, 3-methyl-4-isopropyl phenol, ascorbic acid, 2-tert-butyl-4,6-dimethyl phenol, 2,6-di-tert-butyl phenol, propyl gallate, styrenated mixed cresol, 2-(1-methyl cyclohexyl)-4,6-dimethyl phenol, 2,4-di-tert-butyl-5-methyl phenol, 3,5-di-tert-butyl-4-hydroxytoluene, 2,5-di-tert-butyl-4-hydroxyphenol, 4-hydroxymethyl-2,6-di-tert-butyl phenol, 2,4,6-tri-tert-butyl phenol, 2,6-di-tert-butyl-α-dimethylamino-p-cresol, 1,1-bis(4-hydroxyphenyl)cyclohexane, octyl gallate, nordihydroguaiaretic acid, dodecyl gallate, butylated bisphenol A, 4,4'-methylene-bis(2-tert-butyl-6methyl phenol), 2,2'-methylene-bis(4-methyl-6-tert-butyl phenol), 4,4'-thio-bis(2-methyl-6-tert-butyl phenol), 4,4'-thio-bis(3-methyl-6-tert-butyl phenol), 2,2'-thiobis (4-methyl-6-tert-butyl phenol), 2,2'-methylene-bis(4-ethyl-6-tert-butyl phenol), n-stearoyl-p aminophenol, 4,4'-butylidene-bis(6-tert-butyl-m-cresol), bis(3-methyl-4-hydroxy-5-tert-butylbenzyl)sulfide, 2,2'-methylenebis(4-methyl-6-cyclohexyl phenol), 4,4'-bis(2,6-di-tert-butyl phenol), 2,2'-dihydroxy-3,3+-di(α-methylcyclohexyl)-5,5'-dimethyl dimethyl diphenyl methane, 4,4'-methylene-bis(2,6-di-tert-butyl phenol), D,L-α-tecopherol, 2,2'-methylene-bis(6-α-methylbenzyl-p-cresol), 2,6-bis(2'-hydroxy-3'-tert-butyl-5'-methylbenzyl)-4-methyl phenol, n-octadecyl-3-(4'-hydroxy-3',5'-di-tert-butyl phenyl)propionate, 1,1,3-tris(2-methyl-4-hydroxy-5-tert-butyl phenyl)butane, 4,4'-butylidene-bis(3-methyl-tert-butyl phenol), 6-(4-hydroxy-3,5-di-tert-butylanilino)-2,4-bis(octylthio)-1,3,5-triazine, 2,4-bis(4-hydroxy-3,5-di-tert-butylanilino)-6-(n-octylthio)-1,3,5-triazine, 1,3,5-tris(4-tert-butyl-3-hydroxy-2,6-dimethylbenzyl)-s-triazine-2,4,6-(1H,3H,5H)-trione, tris(3,5-di-tert-butyl-4-hydroxy)phosphate, 1,3,5-trimethyl-2,4,6-tris(3,5-di-tert-butyl-4-hydroxyphenyl)-benzyl benzene, 1,3,5-tris(3',5'-di-tert-butyl-4'-hydroxybenzyl)-s-triazine-2,4,6(1H,3H, 5H) -trione, distearyl(4-hydroxy-3-methyl-5-tert-butyl-benzyl)malonate, ethyleneglycol-bis[3,5-bis(3'-tert-butyl-4'-hydroxyphenyl)]butyrate, tris[2-tert-butyl-4-thio(2'-methyl-4'-hydroxy-5'-tert-butyl phenyl)-5-methylphenyl]phosphite, tetrakis[methylene-3-(3,5-di-tert-butyl-4-hydroxyphenyl) propionate]methane, phenol condensation products, hindered phenol derivative, 3,5-di-tert-butyl-4-hydroxybenzyl phosphoric acid, di-stearyl ester, 2-mercaptobenzimidazole, phenothiazine, N,N'-diphenylthiourea, tetramethyl thiuram disulfide, N-oxy-diethylene-2-benzothiazolylsulfenamide, N-cyclohexyl-2-benzothiazolylsulfenamide, cyclohexylamine salt of 2-mercaptobenzothiazole, N,N-diisopropyl-2-benzothiazelylsulfenamide, 2-N,N-diethylthiocarbamoyl thiobenzothiazole, tetraethylthiuram disulfide, dibenzothiazyl disulfide, zinc diethyldithiocarbamate, zinc ethylphenyldithiocarbamate, zinc di-n-butyldithiocarbamate, dilauryl thiodipropionate, dilauryl thiodi-1-1'-methylbutyrate, dimyristyl-3,3'-thiodipropionate, lauryl stearylthiodipropionate, distearyl thiodipropionate, distearyl thiodibutyrate, penta(erythrythyl-tetra-β-mercaptolauryl)propionate, phenyl-β-naphthylamine, phenyl-β-naphthyl-amine, oxanilide, hydrazine derivatives, 9,10-dihydro-9oxa-10phosphenanthrene-10-oxide, triphenyl phosphite, 2-ethylhexyl acid phosphate, dilauryl phosphite, tri-iso-octyl phosphite, tris(2,4-di-tert-butylphenyl)phosphite, trilauryl phosphite, trilauryl di-thophosphite, trilauryl trithiophosphite, trinonylphenyl phosphite, distearyl pentaerythritol diphosphite, tris(-mixed mono and dinonyl phenyl)phosphite, trioctadecyl phosphite, 1,1,3-tris(2-methyl-4-di-tridecyl phosphite-5-tert-butylphenyl butane and diphenyl phosphite, 4,4'-butylidenebis(3-methyl-6-butyl)tridecyl phosphite, and 4,4'-butylidene-bis(3-methyl-6-tert-butyl-phenylditridecyl)phosphite; weatherability stabilizers such as 2,4-dihydroxybenzophenone, 2-hydroxy-5-chlorobenzophenone, 2-(2'-hydroxy-5'-methylphenyl) benzotriazole, 2-hydroxy-4methoxybenzophenone, 2,2'-dihydroxy-4-methoxybenzophenone, 2,2',4,4'-tetrahydroxybenzophenone, 2-hydroxy-4-methoxy-4'-chlorobenzophenone, p-tert-butyl-pheny salicylate, 2,2'-dihydroxy-4,4'-dimethoxybenzophenone, ethyl-2-cyono3,3-diphenyl acrylate 2-hydroxy-4-benzyloxybenzophenone, 2-(2'-hydroxy-3'-tert-butyl-5'-methylphenyl)-5-chlorobenzotriazole, 2-(2'-hydroxy-3',5'-di-tert-butylphenyl)benzotriazole, 2-(2'-hydroxy-4'-tert-octoxyphenyl)benzotraizole, p-octyl phenyl salicylate, 2-hydroxy-4-noctoxybenzophenone, 2,2'-dihydroxy-4-n-octoxybenzophenone, 2-(2'-hydroxy-4'-octoxyphenyl)-benzotriazole, 2-(2'-hydroxy-3'-tert-butyl-5'-hexyl phenyl)benzotriazole, 2-(2'-hydroxy-3'-tert-butyl-5'-hexyl phenyl)benzotriazole, 2-(2'-hydroxy-3',5'-di-tert-butylphenyl)-5-chlorobenzotriazole, 2-ethyl-2'-ethoxy-5'-tert-butyl-N,N'-diphenyl oxamide, 2,4-di-tert-butylphenyl-3,5-di-tert-butyl-4-hydroxy benzoate, 3,5-di-tert-butyl-4-hydroxy myristyl benzoate, bis(2,2',6,6'-tetramethyl-4-piperidine)sebacate, [2,2'-thio-bis(4-tert-octyl phenolate)]-tert-butyl-amino nickel (II), nickel salt of bis(3,5-di-tert-butyl-4hydroxybenzoyl phospholic acid monoethyl ester, nickel salt of bis(3,5-di-tert-butyl-4-hydroxybenzoyl phosphoric acid monooctyl ester, nickel salt of 2,2'-thio-bis(4,4'-alkylphenol), dimethyl succinate[2-(4-hydroxy-2,2,6,6-tetramethyl-1-piperizyl)ethanol]polycondensate, poly[{6-(1,1,3,3-tetramethylbutyl)imino}-1,3,5-triazine-2,4-diyl -{4-(2,2,6,6-tetramethyl piperizyl)imino}hexamethylene], and 2-hydroxy-4-dodecyloxybenzophenone; lubricants and slip agents, for example aliphatic hydrocarbons such as paraffin wax, polyethylene wax and polypropylene wax, higher fatty acids such as capric acid, lauric acid, myristic acid, palmitic acid, margaric acid, stearic acid, arachidic acid and behenic acid, metal salts of the higher fatty acids such as the lithium, calcium, sodium, magnesium and potassium salts, aliphatic alcohols such as palmityl alcohol, cetyl alcohol and stearyl alcohol, aliphatic amides such as capramide, caprylamide, capric amide, lauric amide, myristic amide, palmitic amide, stearamide, esters between fatty acids and alcohols, and fluorine-containing compounds such as fluoroalkylcarboxylic acids or the metal salts thereof, and fluoroalkylsulfonic acids or the metal salts thereof; antiblocking agents such as silica, talc, clay and diatomaceous earth; antistatic agents such as lauryldiethanolamine, dioxyethylene laurylamine, N,N-bis(2-hydroxyethyl)-stearylamine, stearyl monoglyceride, sodium ditridecyl sulfosuccinate, sorbitan fatty esters, a mixture of an N,N-bis(2-hydroxyethyl)alkylamine and an n-alkyl alcohol silica, polyoxyethylene laurylamine, and stearyl diethanolamine monostearate; antihaze agents such as glyceric acid esters, sorbitan acid esters, acylsarcosines, polyoxyethylene glycerine monostearate and diethanolamine; coloring agents such as titanium dioxide, calcium carbonate, carbon black, lead suboxide, cadmium red, vermillion, red iron oxide, brown iron oxide, barium yellow, titanium yellow, virdian, ultramarine, cobalt blue, cobalt violet, azo pigments, nitroso lake pigments, nitro lake pigments, basic dye lakes, phthalocyanine pigments, organic fluorescent pigments and pearl essence; inorganic or organic fillers such as calcium carbonate, clay, talc, silica, diatomaceous earth, siliceous sand, mica powder, slate flour, alumina white, wood flour, hard rubber dust and cellulose powder; HCl absorbers such as calcium oxide, lithium stearate, sodium stearate, an epoxidation product of octyl stearate, hydrotalcite, calcium stearate, zinc stearate ano calcium 12-hydroxystearate; and nucleating agents such as organic carboxylic acids or the metal salts thereof and benzylidene sorbitol or the derivatives thereof.

The amounts of these additives may be properly chosen so long as they do not substantially affect the excellent properties of the 1-butene resin. For example, the amounts may be about 0.005 to about 5% by weight for the weatherability stabilizers, about 0.05 to about 5% by weight for the heat stabilizers, about 0.1 to about 5% by weight for the slip agents or lubricants, about 0.05 to about 1% by weight for the nucleating agents, about 0.05 to about 5% by weight for the HCl absorbers, about 0.1 to about 5% by weight for the coloring agents, about 0.01 to about 5% by weight for the antiblocking agents, about 0.1 to about 5% by weight for the antihaze agents, about 0.1 to about 5% by weight for the antistatic agents, and about 0.1 to about 20% by weight for the fillers, all based on the weight of the 1-butene polymer.

The fire-retardant composition of this invention can be prepared by mixing the components (A), (B) and (C) with or without the additives described above. Any known means can be used for the mixing operation, and the choice depends upon whether a homogeneous composition can be formed. For example, there may be used (i) a method in which the components (A), (B) and (C) are simultaneously melt-kneaded, (ii) a method in which the components (B) and (C) are melt-kneaded in advance to form pellets and then the pellets are melt-kneaded with the component (A), and (iii) a method in which the components (A) and (B) are melt-kneaded in advance to form pellets, and the pellets are then melt-kneaded with the component (C). The additives may be incorporated at any desired stage before the formation of a final blend, and for example, they may be pre-mixed with the components (A), (B), and/or (C). The melt-kneading temperature may be any suitable temperature at which the components become molten, and is, for example, about 180° C. to about 290° C. Mixing devices that can be used may be any known devices such as a single screw extruder, a multiscrew extruder, a Banbury mixer, or a kneader.

The composition of this invention may be in any form suitable for producing melt-shaped articles, such as a powder, particles and pellets, or may also be in the form of a melt-shaped article. Melt-shaping of the composition may be performed at a temperature of, for example, about 180° to about 280° C., and a pressure of, for example, about 0.5 to about 300 kg/cm$^2$.G.

According to this invention, the drastic deterioration in the mechanical properties of a 1-butene resin, which is ascribable to the incorporation of fire retardants, can be prevented, and the speed of crystallization of the 1-butene resin can be increased.

The following examples illustrate the present invention more specifically. It should be understood that these examples should not be construed as limiting the scope of the invention.

EXAMPLES 1 TO 12 AND COMPARATIVE EXAMPLES 1 TO 5

In each run, a 1-butene resin, magnesium hydroxide, maleic anhydride-grafted polyolefin or copolyolefin having various values of [$\eta$] shown in Table 1 below and optionally another olefin resin were mixed in the proportions indicated in Table 1, and 0.2% by weight of tetrakis[methylene-3-(3,5-di-tert-butyl-hydroxyphenyl propionate]methane, 0.2% by weight of 3,5-di-tert-butyl-4-hydroxytoluene and 0.5% by weight of calcium stearate were added. They were thoroughly mixed with stirring by a Henschel mixer, and then kneaded by a Banbury filler mixer at 220° C. for 5 minutes. The kneaded mixture was pulverized, and press-formed at 200° C. and 50 kg/cm$^2$ for 10 minutes to form a sheet having a thickness of 3 mm. Five rectangular test specimens having a width of 1.52 cm and a length of 12.7 cm and five test specimens for a tensile test were cut out from the sheet. Using these test specimens, a fire retarding test in accordance with UL 94V and a tensile test by an Instron tensile tester were conducted. Furthermore, the crystal transition speed of the specimens were measured by X-ray diffraction.

The results are shown in Table 2.

It is seen that the 1-butene resin compositions of this invention are excellent particularly in fire retardancy, mechanical properties and crystal transition speed.

TABLE 1

| Example (Ex.) or Comparative Example (CEx.) | 1-Butene resin | | | | Amount of magnesium hydroxide (parts by weight) |
|---|---|---|---|---|---|
| | Kind | MFR (g/10 min.) | Degree of crystallinity (%) | Amount added (parts by weight) | |
| Ex. 1 | Homopolymer | 1 | 60 | 100 | 233 |
| Ex. 2 | Homopolymer | 1 | 60 | 100 | 280 |
| Ex. 3 | Homopolymer | 1 | 60 | 100 | 325 |
| Ex. 4 | Homopolymer | 1 | 60 | 100 | 533 |
| Ex. 5 | Homopolymer | 40 | 44 | 100 | 325 |
| Ex. 6 | Homopolymer | 40 | 44 | 100 | 300 |
| Ex. 7 | Ethylene/1-butene copolymer (ethylene content 6 mole %) | 10 | 32 | 100 | 433 |
| Ex. 8 | Homopolymer | 1 | 60 | 100 | 260 (*) |
| Ex. 9 | Ethylene/1-butene copolymer (ethylene content 6 mole %) | 10 | 32 | 100 | 325 (*) |
| Ex. 10 | Homopolymer | 1 | 60 | 100 | 300 |
| Ex. 11 | Homopolymer | 1 | 60 | 100 | 260 |
| Ex. 12 | Homopolymer | 1 | 60 | 100 | 260 |
| CEx. 1 | Homopolymer | 1 | 60 | 100 | 186 |
| CEx. 2 | Homopolymer | 1 | 60 | 100 | 100 |
| CEx. 3 | Homopolymer | 1 | 60 | 100 | 325 |
| CEx. 4 | Homopolymer | 1 | 60 | 100 | 260 |
| CEx. 5 | Homopolymer | 1 | 60 | 100 | 260 |

| Example (Ex.) or Comparative Example (CEx.) | Olefin resin | | Maleic anhydride-grafted polyolefin | | | |
|---|---|---|---|---|---|---|
| | Kind | Amount (parts by weight) | Trunk polymer | Amount of maleic hydride grafted (wt %) | $[\eta]$ (dl/g) | Amount added (parts by weight) |
| Ex. 1 | None | — | | | 1.82 | 37 |
| Ex. 2 | None | — | | | 0.42 | 20 |
| Ex. 3 | None | — | | | 2.82 | 75 |
| Ex. 4 | None | — | | | 1.52 | 33 |
| Ex. 5 | Polypropylene (MFR = 6, II = 94) | 50 | Polypropylene | 1.0 | 0.38 | 25 |
| Ex. 6 | Ethylene/propylene random copolymer (ethylene content 5 mole %, MFR = 10) | | | | 0.38 | 25 |
| Ex. 7 | Polypropylene (MFR = 2, II = 95) | 67 | | | 0.85 | 67 |
| Ex. 8 | None | — | | | 0.85 | 40 |
| Ex. 9 | Polypropylene (MFR = 2, II = 95) | 25 | | | 0.85 | 50 |
| Ex. 10 | Polypropylene (MFR = 6, II = 94) | 300 | Propylene/1-butene random copolymer (propylene content 80 mol %) | 1.0 | 1.0 | 25 |
| Ex. 11 | None | — | Propylene/1-butene random copolymer (propylene 93 mol %) | 0.6 | 1.5 | 40 |
| Ex. 12 | None | — | Propylene/ethylene random copolymer (propylene 92 mol %) | 0.8 | 1.5 | 40 |
| CEx. 1 | None | — | — | — | — | — |
| CEx. 2 | None | — | Polypropylene | 1.0 | 1.5 | 22 |
| CEx. 3 | Polypropylene (MFR = 6, II = 94) | 75 | — | — | — | — |
| CEx. 4 | None | — | Polyethylene | 1.0 | 1.8 | 40 |
| CEx. 5 | None | — | Ethylene/propylene random copolymer (ethylene 82 mol %) | 1.0 | 1.2 | 40 |

(*) Amount of aluminum hydroxide

TABLE 2

| Example (Ex.) or Comparative Example (CEx.) | Fire retardancy (UL 94V, 1/8") | Tensile properties | | | | Crystal transition speed (50% transition time in hours determined by X-ray diffraction) |
|---|---|---|---|---|---|---|
| | | Stress at yield (kg/cm$^2$) | Stress at break (kg/cm$^2$) | Elongation at break (%) | Stress at 1% strain (kg/cm$^2$) | |
| Ex. 1 | V-O | 239 | 236 | 35 | 141 | 1 |
| Ex. 2 | V-O | 221 | 203 | 16 | 136 | 2 |

TABLE 2-continued

| Example (Ex.) or Comparative Example (CEx.) | Fire retardancy (UL 94V, ⅛") | Tensile properties | | | | Crystal transition speed (50% transition time in hours determined by X-ray diffraction) |
| --- | --- | --- | --- | --- | --- | --- |
| | | Stress at yield (kg/cm²) | Stress at break (kg/cm²) | Elongation at break (%) | Stress at 1% strain (kg/cm²) | |
| Ex. 3 | V-O | 234 | 246 | 35 | 132 | 0.5 |
| Ex. 4 | V-O | 202 | 196 | 3.6 | 135 | 2 |
| Ex. 5 | V-O | 234 | 242 | 28 | 128 | 2 |
| Ex. 6 | V-O | 216 | 222 | 32 | 113 | 1 |
| Ex. 7 | V-O | 236 | 230 | 24 | 128 | 1 |
| Ex. 8 | V-O | 248 | 226 | 18 | 158 | 1 |
| Ex. 9 | V-O | 240 | 246 | 36 | 110 | 1 |
| Ex. 10 | V-O | 241 | 265 | 41 | 130 | 0.5 |
| Ex. 11 | V-O | 230 | 252 | 42 | 128 | 0.5 |
| Ex. 12 | V-O | 215 | 248 | 48 | 120 | 0.5 |
| CEx. 1 | V-O | 100 | 115 | 250 | 23 | 10 |
| CEx. 2 | HB | 163 | 225 | 380 | 121 | 1 |
| CEx. 3 | V-O | — | 115 | less than 1.0 | — | 0.5 |
| CEx. 4 | V-O | 159 | 126 | 6.5 | 98 | 10 |
| CEx. 5 | V-O | 168 | 168 | 16 | 103 | 8 |

What is claimed is:

1. A fire-retardant 1-butene resin composition composed of
   (A) 100 parts by weight of a 1-butene polymer or copolymer containing 0 to 20 mole% of an olefin with 2 to 20 carbon atoms other than 1-butene as a comonomer,
   (B) 110 to 1,000 parts by weight of an inorganic hydroxide in the form of a fine powder and selected from the group consisting of magnesium hydroxide and aluminum hydroxide, and
   (C) 10 to 150 parts by weight of a graft-modified olefin resin resulting from grafting of an unsaturated carboxylic acid selected from the group consisting of maleic acid, citraconic acid, itaconic acid, 5-norbornene-2,3-dicarboxylic acid and an acid anhydride thereof, to a polymer or a copolymer selected from the group consisting of a polypropylene, a propylene/ethylene copolymer containing up to 20 mole% of ethylene, a propylene/1-butene copolymer containing up to 30 mole% of 1-butene and a propylene/4-methyl-1-pentene copolymer containing up to 30 mole% of 4-methyl-1-pentene.

2. A composition according to claim 1 wherein the 1-butene polymer or copolymer (A) has a melt flow rate, determined by ASTM D 1238N, of from 0.1 to 50 g/10 min.

3. A composition according to claim 1 wherein the 1-butene polymer or copolymer (A) has a degree of crystallinity of from 20 to 65%.

4. A composition according to claim 1 wherein the inorganic hydroxide (B) has an average particle size of from about 50 millimicrons to about 5 microns.

5. A composition according to claim 1 wherein the graft-modified olefin resin (C) results from grafting of about 0.01 to about 10 parts by weight of the unsaturated carboxylic acid or its functional derivative to 100 parts by weight of the olefin polymer or copolymer.

6. A composition according to claim 1 wherein the amount of the graft-modified olefin resin (C) is about 3 to about 25% by weight based on the total weight of the components (A), (B) and (C).

7. A composition according to claim 1 which further comprises up to about 200 parts by weight of an olefin resin other than the 1-butene polymer or copolymer per 100 parts by weight of the 1-butene polymer or copolymer.

8. A composition according to claim 1 or 7 which further comprises at least one additive selected from the group consisting of weatherability stabilizers in the amount of 0.005 to 5% by weight, heat stabilizers in the amount of 0.05 to 5% by weight, slip agents in the amount of 0.1 to 5% by weight, nucleating agents in the amount of 0.05 to 1% by weight, coloring agents in the amount of 0.1 to 5% by weight, and lubricants in the amount of 0.1 to 5% by weight all based on the weight of the 1-butene polymer.

9. A composition according to claim 1 or 7 which is in the form of a melt-shaped article produced at a temperature of about 180 to about 280° C. and a pressure of about 0.5 to about 300 kg/cm².G.

10. A composition according to claim 8 which is in the form of a melt-shaped article produced at a temperature of about 180 to about 280° C. and a pressure of about 0.5 to about 300 kg/cm².G.

11. A composition according to claim 1 wherein the inorganic hydroxide is in the form of a fine powder having a particle size of 50 millimicrons to 5 microns.

12. A fire retardant 1-butene resin composition comprising
   (A) 100 parts by weight of 1-butene homopolymer or a random copolymer of 1-butene with up to 20 mole % of an olefin having 2 to 8 carbon atoms, said homopolymer or copolymer having a melt flow rate of 0.1 to 50 g/10 min and a degree of crystallinity of from 20 to 55%;
   (B) 110 to 1000 parts by weight of a fine powdery magnesium hydroxide or aluminum hydroxide having an average particle size of from about 50 millimicrons to about 5 microns, said magnesium hydroxide or aluminum hydroxide imparting fire-retardancy to said composition; and
   (C) 10 to 150 parts by weight of graft-modified olefin resin in which the grafting monomer comprises from about 0.01 to about 10 parts by weight per 100 parts by weight of the olefin resin and is maleic acid, citraconic acid, itaconic acid, 5-norbornene-2,3-dicarboxylic acid or an anhydride of any of said acids, and the olefin resin is polypropylene, propylene/ethylene copolymer containing up to 20 mole % of ethylene, propylene/1-butene copolymer containing up to 30 mole % of 1-butene; or propylene/4-methyl-1-pentene copolymer containing up to 30 mole % of 4-methyl-1-pentene, said graft-modified olefin resin improving the mechanical properties and moldability of the composition and increasing the crystal transition speed of the 1-butene homopolymer or copolymer.

13. The fire-retardant 1-butene resin composition of claim 15 which comprises
   (A) 1-butene homopolymer;
   (B) fine powdery magnesium hydroxide fire-retardant; and
   (C) a graft-modified olefin resin in which the grafting monomer is maleic anhydride and the olefin resin is polypropylene.

14. The fire-retardant 1-butene resin composition of claim 12 which comprises
   (A) 1-butene homopolymer;
   (B) fine powdery magnesium hydroxide fire-retardant; and
   (C) a graft-modified olefin resin in which the grafting monomer is maleic anhydride and the olefin resin is a propylene/ 1-butene random copolymer.

15. The fire-retardant 1-butene resin composition of claim 12 comprising
   (A) a random copolymer of 1-butene with ethylene;
   (B) fine powdery magnesium hydroxide fire-retardant; and
   (C) a graft modified olefin resin in which the grafting monomer is maleic anhydride and the olefin resin is polypropylene.

16. The fire-retardant 1-butene resin composition of claim 12 having a fire retardancy rating of V-O and a crystal transition speed of from 0.5 to 2 hours.

* * * * *